(12) United States Patent
Vu et al.

(10) Patent No.: US 6,557,104 B2
(45) Date of Patent: *Apr. 29, 2003

(54) METHOD AND APPARATUS FOR SECURE PROCESSING OF CRYPTOGRAPHIC KEYS

(75) Inventors: Son Trung Vu, Huntington Beach, CA (US); Quang Phan, Tustin, CA (US)

(73) Assignee: Phoenix Technologies Ltd., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/848,963

(22) Filed: May 2, 1997

(65) Prior Publication Data

US 2001/0008015 A1 Jul. 12, 2001

(51) Int. Cl.[7] ................................................. H04L 9/32
(52) U.S. Cl. .......................... 713/189; 713/192; 713/193
(58) Field of Search ....................... 380/23, 25; 713/192, 713/193, 194, 185, 187, 189, 190, 200

(56) References Cited

U.S. PATENT DOCUMENTS

| | | | |
|---|---|---|---|
| 4,634,807 A | * 1/1987 | Chorley et al. ............... 705/55 |
| 5,148,481 A | * 9/1992 | Abraham et al. ............. 380/46 |
| 5,175,853 A | 12/1992 | Kardach et al. |
| 5,237,616 A | * 8/1993 | Abraham et al. ............ 713/193 |
| 5,289,540 A | * 2/1994 | Jones ........................... 713/165 |
| 5,293,424 A | * 3/1994 | Holtey et al. ................. 380/23 |
| 5,606,615 A | * 2/1997 | Lapointe ....................... 380/25 |
| 5,615,263 A | 3/1997 | Takahashi ...................... 380/4 |
| 5,652,890 A | 7/1997 | Foster et al. |
| 5,664,225 A | * 9/1997 | Ayash ......................... 395/869 |
| 5,748,888 A | * 5/1998 | Angelo et al. ............... 713/200 |
| 5,778,071 A | * 7/1998 | Caputo et al. ................ 380/25 |
| 5,883,956 A | * 3/1999 | Le et al. ......................... 380/4 |
| 5,953,422 A | * 9/1999 | Angelo et al. .............. 713/185 |

FOREIGN PATENT DOCUMENTS

| | | |
|---|---|---|
| GB | 2 259 166 | 3/1993 |
| WO | 93/17388 | 9/1993 |
| WO | 95/24696 | 9/1995 |
| WO | 98/19243 | 5/1998 |

OTHER PUBLICATIONS

Bill oliver, Crytographic Engine V3.2, Mar. 30, 2002, pp. 5–15.*

Arbaugh,Farber,Smith, A Secure and Reliable Bootstrap Architecture,IEEE,Nov. 1997,pp. 67–70.*

Romans,Ratliff, Linux Security "State of the Union",May 11, 2001, pp. 3–14.*

* cited by examiner

Primary Examiner—Gail Hayes
Assistant Examiner—Ho S. Song

(57) ABSTRACT

A method and apparatus for secure processing of cryptographic keys, wherein a cryptographic key stored on a token is processed in a secure processor mode using a secure memory. A main system processor is initialized into a secure processing mode, which cannot be interrupted by other interrupts, during a power-on sequence. A user enters a Personal Identification Number (PIN) to unlock the cryptographic key stored on the token. The cryptographic key and associated cryptographic program are then loaded into the secure memory. The secure memory is locked to prevent access to the stored data from any other processes. The user is then prompted to remove the token and the processor exits the secure mode and the system continues normal boot-up operations. When an application requests security processing, the cryptographic program is executed by the processor in the secure mode such that no other programs or processes can observe the execution of the program. Two-factor authentication is thus obtained without the need for any additional hardware.

8 Claims, 5 Drawing Sheets

METHOD AND APPARATUS FOR SECURE PROCESSING OF CRYPTOGRAPHIC KEYS

BACKGROUND OF THE INVENTION

1. Field of the Invention

The present invention relates generally to the field of computer security and more particularly, to a method and apparatus for secure processing of cryptographic keys.

2. Description of Related Art

Computer security concerns are prompting users to take extraordinary measures to protect confidential information. Computer systems employ various types of access restrictions to insure that only authorized users can gain access to the system resources. Complex encryption and decryption algorithms are used to protect confidential information from being intercepted and decoded while being sent over public networks. Furthermore, new techniques such as digital signatures, digital envelopes, certification, authentication and non-repudiation are being used to authenticate users, allow privileged access, and to promote secure online electronic commerce. All these techniques require some form of "secret" information, called "keys," in order to secure the information. The secret keys used to secure data, allow access, authenticate users, etc. are collectively referred to as "cryptographic keys." These cryptographic keys, to be most effective, should be handled in a secure environment so that security breaching processes cannot discover the "secret" information. Cryptography techniques are discussed generally in *Applied Cryptography*, $2^{nd}$ Edition, Bruce Schneier, John Wiley & Sons, Inc. (1996), herein incorporated by reference.

For example, one method of remote user access involves the use of a secret key stored on a token and is known as challenge/response identification. The token may consist of any type of removable storage device, such as a floppy disk, a Fortezza card, PCMCIA card, smart card, or even a "virtual" smart card which exists only in software. Physical possession of the token allows the user to access the remote server. In this scheme, the host sends a random number to the user as a challenge. The user returns a response based on a mathematical calculation on the challenge and a secret key known to both parties. By independently performing the same calculation at both ends, the identity of the user may conclusively be determined. The secret key itself is never transmitted, eliminating the possibility of it being captured on the public network.

Processing the response and the secret key on the user's computer, however, creates security problems. The user may observe the secret key and validation program and copy the secret key and/or validation program. Other software running on the computer may also observe and copy the secret information. Thus, the secret key and validation program should be processed in a secure environment which cannot be tampered with or observed by the user or other computer processes.

In order to protect the secret key and validation program from tampering, the preferred method has been to use smart cards. Each smart card is a credit card sized plastic card which has a special type of embedded integrated circuit. The integrated circuit holds information in electronic form and processes the information within the confines of the card. Since the secret key and any necessary encryption/decryption algorithms or validation programs are processed within the smart card, outside processes cannot observe the secret information. The internal processing of the smart card is not even viewable by the user. Smart cards typically consist of the following components:

- a microprocessor (usually 8-bit)
- EEPROM (usually 8 to 32 Kbit)
- an on-chip operating system
- embedded cryptographic software (implementing either DES, zero-knowledge, or RSA algorithm)
- a secret key encrypted with a permanent PIN preprogrammed into the EEPROM The smart card provides a secured environment for storage and processing of the secret key because all operations based on the secret key are performed within its boundary. The secret key or cryptographic algorithms are thus never exposed to the outside world, and therefore cannot be observed by unauthorized users. Smart cards have been used to implement not only password validation schemes, but also encryption/decryption algorithms, user authentication, and non-repudiation methods. Any application which requires some secret information in order to process data can be adapted to take advantage of a smart card's secure processing environment. The physical smart card scheme, however, is expensive and cumbersome because each user must have a physical smart card and a smart card reader in order to gain system access. Smart card readers currently cost about $100 each in small quantities, and the smart cards themselves cost between $6 to $8 per card. Installing physical smart card readers in each computer could represent a significant expense for even a small implementation.

Recognizing the costs associated with implementing physical smart card authentication systems, several companies have proposed using "virtual smart cards." As currently implemented, a virtual smart card exists in software, and runs as an application. The secret key is usually stored on a hard drive or a floppy disk and is protected by a Personal Identification Number (PIN). Thus, any machine which has the virtual smart card software and associated PIN can access the remote system. The problem with this approach, however, is that the processing of the secret key is done in the "open"—i.e. the secret key is read into the system memory and unlocked in an "open" mode. This makes the key and its processing susceptible to tampering by other processes running on the same system.

It would therefore be desirable to have a computer security system in which cryptographic keys, algorithms, and associated programs are stored and processed in a secure processing environment, which cannot be accessed by other system processes or observed by the user. It would also be desirable for the security system to use existing hardware, without requiring any additional peripheral devices.

SUMMARY OF THE INVENTION

The present invention is a method and apparatus for secure storage and processing of cryptographic keys using a secure processor mode and an associated secure memory. A processor is initialized into a secure processing mode which cannot be interrupted by other interrupts. The associated secure memory cannot be accessed by any other processes, when the processor is not in the secure processing mode. During runtime, when the processor enters the secure processing mode, the operating system is suspended.

A cryptographic key, stored in an encrypted form, resides on a removable storage device, such as a floppy disk, CD-ROM, dongle, etc. The system reads the cryptographic key from the removable storage device into the secure memory only when the system has entered the secure processor mode. Any required cryptographic programs, which may be stored in the system BIOS, are also loaded into the secure memory when the processor is in the secure mode. The secure memory is locked, if necessary, to prevent other processes from accessing the stored data. Once the key and program are loaded into the secure memory, the user is prompted to remove the removable storage device and the processor exits the secure mode. Thus, the loading of the key and program into the secure memory is invisible to the operating system and other processes.

The user may be required to enter a PIN to unlock the secret key stored in the secure memory. By loading the secret key into the secure memory, and unlocking the key with the PIN, the system has the same functionality as a physical smart card. Applications can request cryptographic services, as if a physical smart card is attached to the system. Each time an application requests a cryptographic service, the processor enters the secure processor mode to perform the required operations. Thus, the storage and processing of the secret key is transparent to the operating system and other processes. To clear the key, the user can request the system to clear the secure memory.

As described herein, the system enters the secure processor mode to load the secret key and required cryptographic programs into the secure memory. The system may enter the secure mode to load and process the key and required cryptographic programs at any time during run-time, or at boot-time. However, the processor does not have to be in the secure mode during boot-time in order to load or process the key, since no other processes are running. Secure processing of the cryptographic key is thus obtained without the need for any additional hardware.

BRIEF DESCRIPTION OF THE DRAWINGS

The exact nature of this invention, as well as its objects and advantages, will become readily apparent from consideration of the following specification as illustrated in the accompanying drawing, and wherein.

DESCRIPTION OF THE PREFERRED EMBODIMENTS

Figure 1:
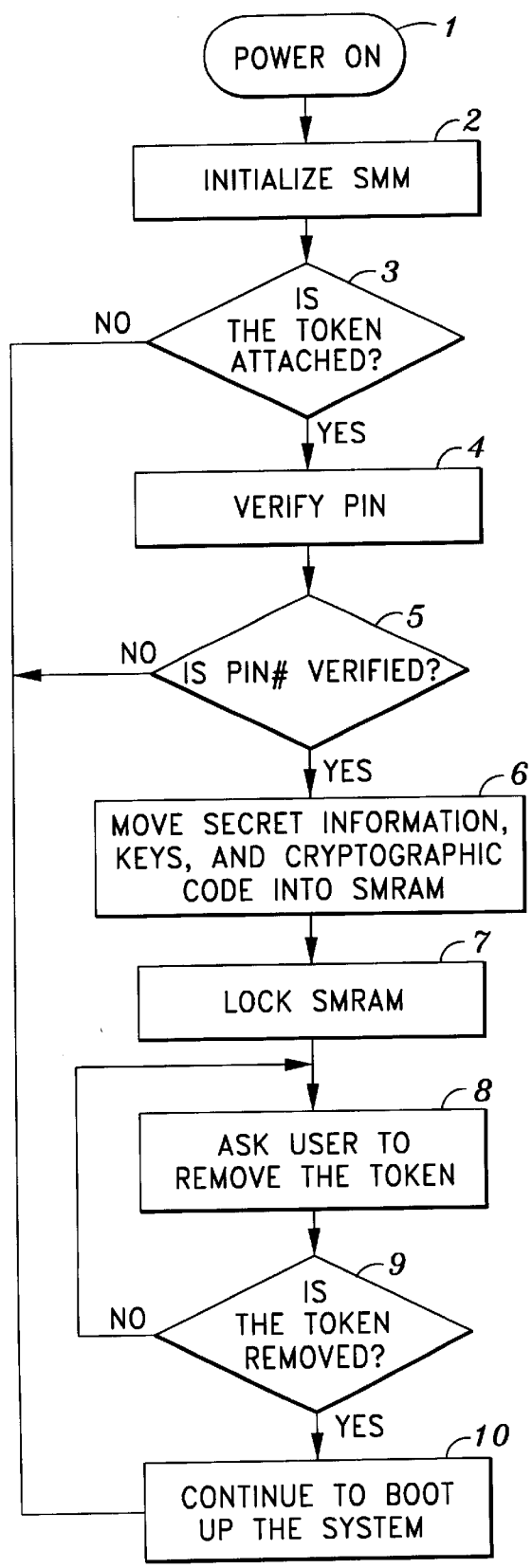
FIG. 1 is a flowchart showing a power-on sequence utilizing the present invention.

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a method and apparatus for secure processing of cryptographic keys.

The present invention uses a special secure processing mode to process a cryptographic key provided on a token and an associated special secure memory area which is transparent to the operating system. One example of a secure mode is the System Management Mode (SNM) of the Intel x86. (80386 and later) processor architecture, and compatible processors. The associated memory is known as the System Management RAM (SMRAM). The processor's System Management Mode (SMM) and the System Management RAM (SMRAM) are both transparent to the operating system and its applications. The cryptographic key and algorithms, once stored into SMRAM, can be used during SMM such that both the cryptographic key and its processing are never exposed. This method and apparatus thus provides secure cryptographic key processing without the need for expensive smart card hardware, and is more secure than virtual smart card processing.

A preferred embodiment of the present invention will now be described with reference to FIG. 1. The following description of the preferred embodiment applies to the power-on sequence of a computer system. Since there is no operating system loaded during the power-on sequence, the cryptographic key and programs can be loaded without any other processes observing their contents, so entering SMM is not strictly necessary. The present invention may be used at other stages of system operation by invoking the SMM without departing from the scope of the invention.

At step 1, a computer system is powered on and the System Management Mode (SMM) of an Intel x86 (80386 or later) processor is initialized at step 2. At step 3, a determination is made whether the "token" is attached to the computer system. The "token" may include any type of removable physical storage device, such as a magnetic strip, PCMCIA card, floppy disk, CD-ROM or any other similar removable storage device. The token contains the cryptographic key and any other information which is needed by the cryptographic program. Unlike a physical smart card, though, the token does not need to contain its own processor and accompanying hardware, since the processing will take place in the main system processor in a secure mode. Thus, these removable storage devices are much less expensive than physical smart cards.

If the token is not present in the system, a normal system boot-up continues at step 10 and the system will not have any smart card functionality. Otherwise, a user's personal identification number (PIN) is verified at step 4. By requiring a PIN in addition to the token, the present invention thus implements "two factor authentication" which provides more security than single password schemes. The two "factors" used in this method are the user's PIN and the secret cryptographic key. By requiring both factors, the risk of a security breach is greatly reduced. The present invention may also be implemented without requiring a PIN, but the security benefits would accordingly be reduced. If the user's PIN is not valid at step 5, the normal system boot-up continues at step 10 and the system will not have any smart card functionality.

Once the user's PIN is verified, the cryptographic key stored on the token is loaded into the System Management RAM (SMRAM). A cryptographic program and any other data or information which may be required for the cryptographic processing are also loaded into the SMRAM at step 6. It is not critical where the cryptographic program and associated algorithms are stored initially, provided that they have not been altered. The algorithms initially can be stored on the BIOS flash ROM or even a floppy disk. In the preferred embodiment, the cryptographic programs and algorithms are loaded in the system BIOS.

The SMRAM is then locked at step 7 which prevents any other processes from accessing the data stored in the SMRAM. Other architectures or hardware solutions may not require the additional locking step, if the memory by design can only be accessed during the secure processor mode.

Since moving the cryptographic key and associated algorithms are done at boot time, the cryptographic process is safe from tampering by other processes (there are no other processes running at this time). Further, the SMRAM is locked and hidden by the chipset before the operating system is loaded, making the SMRAM's contents tamperproof from the operating system. Thus the System Management Mode provides a secure processing environment, similar to a physical smart card, but without requiring any additional hardware, or the expense of a physical smart card.

The user is asked to remove the physical token at step 8 to insure system integrity. Once the token has been removed (step 9), the normal system boot procedures continue at step 10. The cryptographic key is never visible to the user and is not visible to any security breaching processes which may be running on the computer system. Thus, the present invention provides the security features associated with physical smart cards, without the associated costs. The processing of the cryptographic key can be done during the power-on sequence if desired. However, in the preferred embodiment, the processing does not occur until an application program requests the security services in order to mimic the functionality of a smart card.

Figure 2:
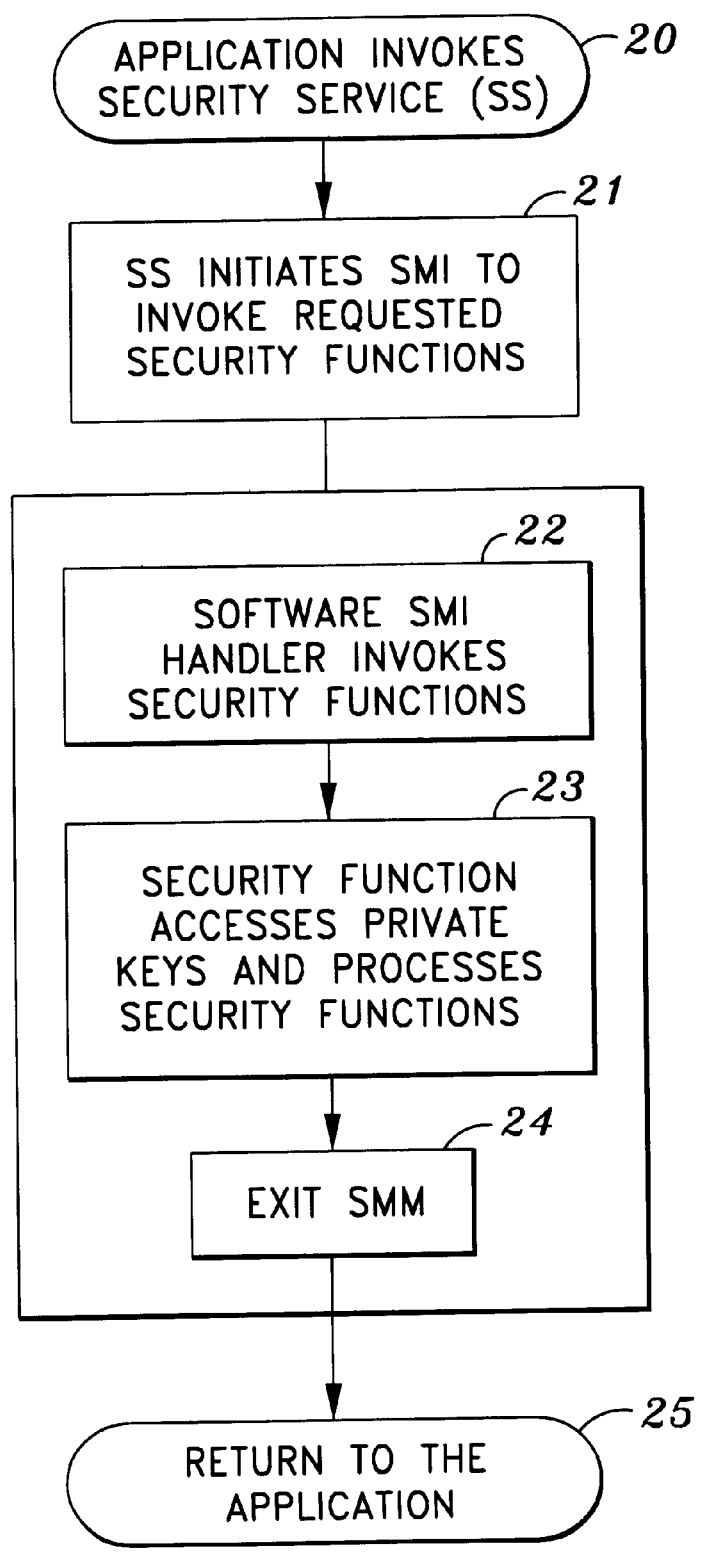
FIG. 2 is a flowchart illustrating the run-time processing of the present invention.

The run-time processing of a preferred embodiment of the present invention is illustrated in FIG. 2. At step 20, an application program which needs to access a secure computer system or network, such as a remote server, invokes the Security Services routine of the present invention. The Security Services routine in turn invokes a software System Management Interrupt (SMI) at step 21. The SMI is the highest level interrupt mode in the Intel x86 architecture and cannot be interrupted by other interrupts. The SMI initializes the system processor into SMM. Once the processor is in SMM, a software SMI handler invokes the security function at step 22. The security function accesses the cryptographic key and programs stored in the SMRAM at step 23. The processor executes the requested security processing in the SMM. This processing may include encryption/decryption of documents, processing secret keys for password validation, user authentication, etc. Once the processing is complete, the processor exits the SMM at step 24, and normal system operation continues at step 25. The appropriate cryptographic information is provided to the application program at step 25. The entire processing has occurred in a secure mode and a secure memory area which are not visible to the applications previously running on the processor. Also, the application program is unaffected by the absence of a physical smart card.

To further illustrate the present invention, consider a typical virtual smart card application which has been modified to take advantage of the present invention. A user may log onto a remote server using a software application program. The remote server may issue a challenge, and expect an appropriate response before allowing the user access. Upon receiving a challenge from the remote server, the user invokes a response calculator program to calculate a response to return to the remote server. The response calculator program passes the challenge string to the main system processor via a soft SMI (steps 20, 21). At this point, SMM takes over and the entire operating system and its applications are put into a "sleep mode." The operations to calculate the response based on the cryptographic key and the challenge are then performed (steps 22, 23). The response is delivered to the response calculator program and the operating system is resumed (step 25). The response calculator program sends the response to the remote server to complete the authentication process. The operating system is entirely unaware of the response calculation process and thus not able to interfere with it.

The above description of FIGS. 1 and 2 assume that the cryptographic key and program are loaded into the secure memory during boot time, and are processed later during system operation. The cryptographic key and program may also be loaded after the system has already booted, as long as the loading is done in the secure mode, i.e. SMM. Also, the cryptographic key and program may be loaded at different times. The program may be loaded during boot time, and the key at a later time. This implementation would be useful for computers which have multiple users and thus multiple keys, wherein all the keys rely on the exact same processing algorithm. The algorithm could be loaded at boot time, and the keys loaded later, as each user requests security services. Those skilled in the art will appreciate that numerous possible variations of loading and processing the cryptographic keys and programs are possible, which are within the scope of the present invention, as long as the loading and processing are performed in the secure processor mode using the secure memory.

In FIG. 1, the user enters a PIN during the power-on sequence to unlock the secret cryptographic key. By requiring the PIN to be entered before the operating system has loaded, other programs cannot intercept the PIN. Alternatively, the present invention may be implemented without requiring a PIN, although the security benefits are reduced. Also, a PIN can be required at various stages of processing, even after the operating system has loaded, if desired. For example, in certain applications, a token may be used after the system has booted. In this case, the PIN is entered and is passed to the SMM process, along with the cryptographic data and programs, via a soft SMI. The operating system is put into a "sleep mode" while the cryptographic key is processed.

Figure 3:
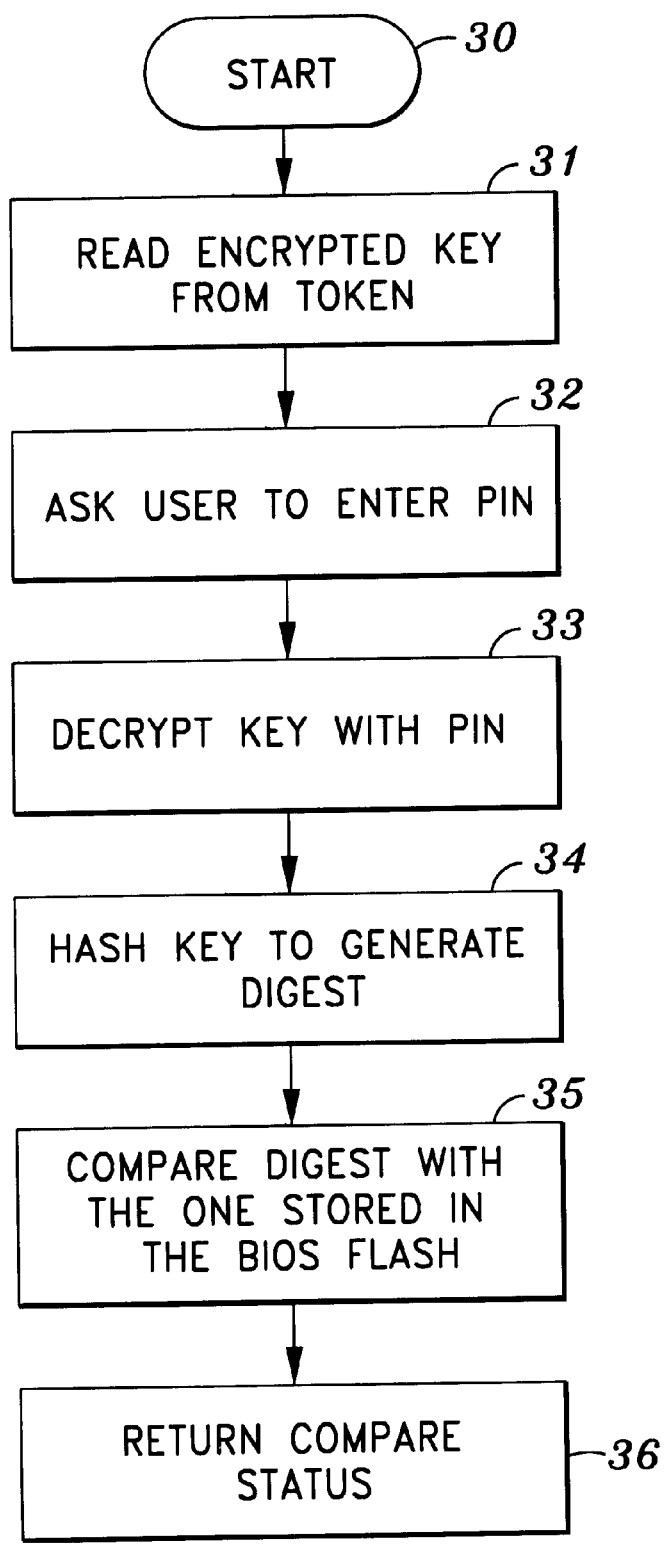
FIG. 3 is a flowchart illustrating a preferred method of validating a user's Personal Identification Number (PIN)

A preferred embodiment of the PIN verification method (step 4) used during the power-on sequence is illustrated in FIG. 3. The PIN verification process starts at step 30, and reads an encrypted key stored on a token. The user is prompted to enter a PIN number at step 32. The PIN is then used to decrypt the key at step 33. A hash function is used to generate a digest of the key at step 34. A hash function is a keyless mathematical function which produces a fixed-length representation of the key as output. Examples of hash functions include MD5, SHA, and RIPEMD-160. The digest produced by the hash function in step 34 is compared with a copy of a digest stored in the system BIOS. The results of the comparison are returned at step 36. If the digests match, the PIN is verified at step 5 of FIG. 1. Once the PIN is verified, the contents of the token can then be loaded in the SMRAM. Thus, the PIN verification step adds another layer of system security to prevent unauthorized access, even if someone has stolen the token.

Figure 4:
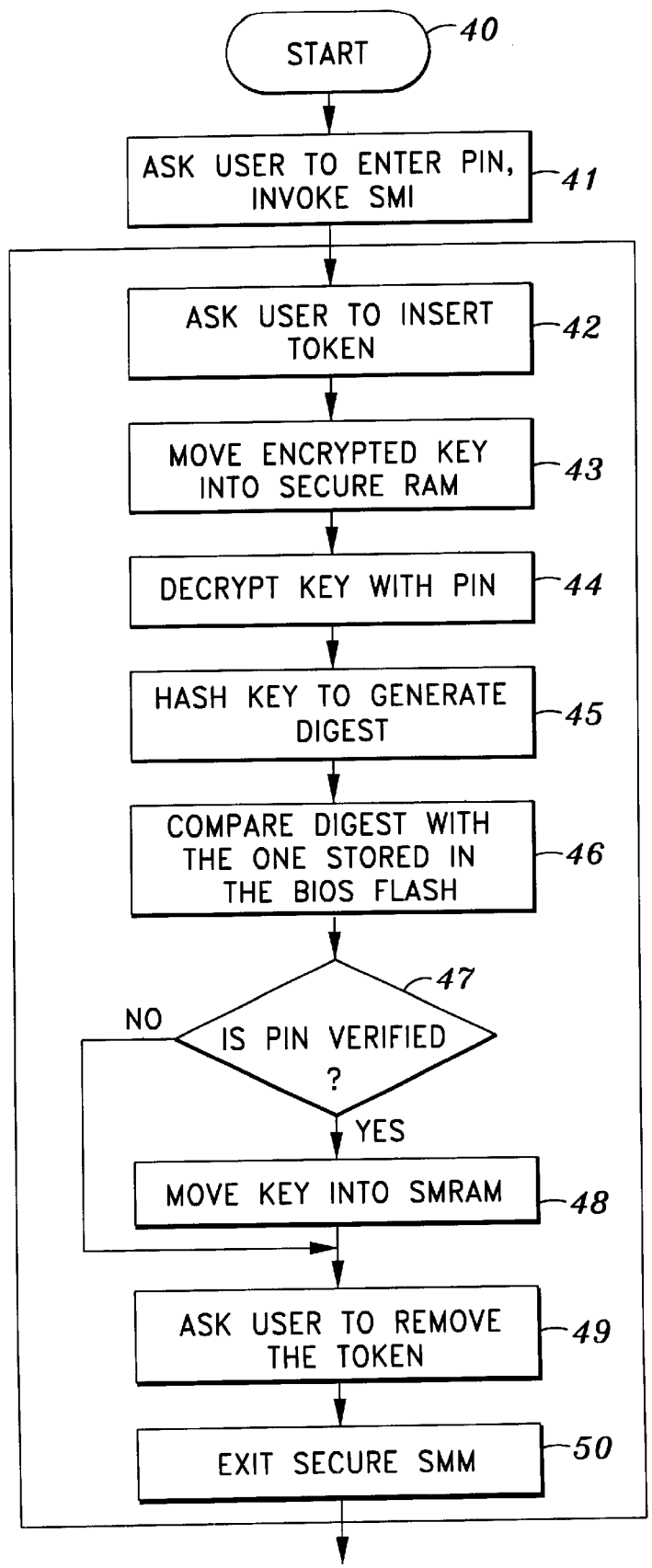
FIG. 4 is a flowchart illustrating a run-time loading of the secret key.

FIG. 4 illustrates an example of the present invention wherein the secret key is loaded after the system has already booted. It is assumed that during the boot sequence, the necessary cryptographic program has already been loaded into the SMRAM. This embodiment: is useful, as described above, in situations where the same cryptographic algorithm is used by different users having different secret keys. A user's application program requests the user to enter a PIN at step 41, and invokes an SMI. The processor enters SMM and the user is requested to insert the token (removable storage device) at step 42. An encrypted key stored on the token is loaded into the SMRAM at step 43, and the encrypted key is decrypted at step 44 using the PIN. The key is processed using a hash function to generate a digest at step 45. The hashed digest is compared to a digest stored in the BIOS at step 46. If the digests match, the PIN is verified at step 47 and the key is loaded into the SMRAM at step 48. If the PIN is not verified, the key will not be loaded into the SMRAM. The user is prompted to remove the token at step 49, to insure system security, and then the processor exits SMM at step 50. The present invention is now ready to process any security service requests which a current user's applications may need. Alternately, the cryptographic processing could be immediately performed between steps 48 and 49, if desired.

Figure 5:
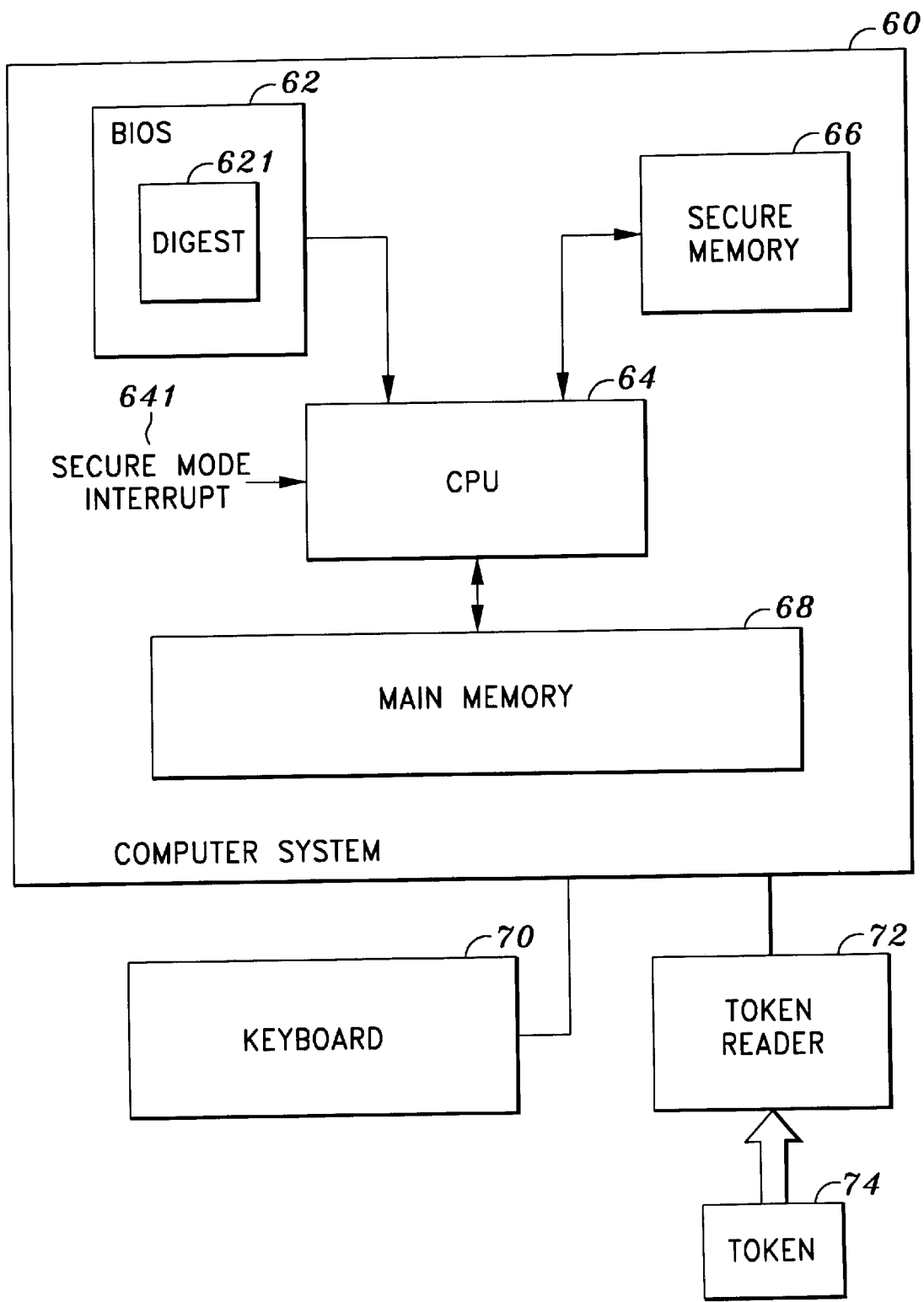
FIG. 5 is a block diagram illustrating the apparatus of the present invention.

FIG. 5 is a block diagram of an apparatus of the present invention. A computer system 60 contains a central processing unit (CPU) 64 which has a secure processing mode which cannot be interrupted by other interrupts. The CPU 64 has an interrupt line 641 upon which an secure mode interrupt initializes the CPU 64 into the secure mode. A secure memory 66 is connected to the CPU 64, and can only be accessed by the CPU 64 when the CPU 64 is in the secure processing mode. A main system memory 68 is also connected to the CPU 64 and is used by the operating system and application programs. A system BIOS 62 stores a hashed digest 621 of a PIN, which is compared to a digest calculated from a PIN entered by a user via the keyboard 70. A token reader 72 reads the cryptographic key, data and programs stored on a token 74. The token reader 72 may include a sensor to detect the presence or absence of the token 74. The operation of the apparatus of the present invention is as described above in connection with the method of the present invention and the associated flow charts.

Note that this invention is applicable to the storage and processing of any type of cryptographic key. The cryptographic key could be a cryptographic key in the symmetric key system or a private key as used in the Public Key Cryptography System. Through this invention, the secured processing facility of smart cards is achieved without the expense of actually employing physical smart cards. It can be used to improve the security of virtual smart cards as well as any other application that uses only software to process and store the cryptographic key.

While the preferred embodiment has been described herein with reference to the Intel x86 compatible architecture (80386 and later), the present invention is applicable to any processor architecture which has a secure processing mode which cannot be interrupted by other interrupts and has a secure memory area which can only be accessed while the processor is in the secure processing mode. Most known processors have a highest level interrupt level which can satisfy the first requirement, and the memory requirement can be met be proper design of the chip-sets or logic external to the processor.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for secure processing of cryptographic keys, comprising:

loading, by a system processor, a cryptographic program and any associated data into a secure memory, said secure memory only being accessible by the system processor in a secure mode;

loading, by the system processor, a cryptographic key into the secure memory;

detecting a request for security operation by an application program;

the system processor, entering the secure mode;

performing the security operation in the secure memory using the cryptographic program and cryptographic key;

the system processor, exiting the secure mode; and passing any cryptographic information to the application program;

the system processor, performing other operations in a system memory, including executing an operating system, when the processor is not in the secure mode.

2. The method of claim 1, wherein the cryptographic key, the cryptographic program and any cryptographic data are loaded into the secure memory during the boot time.

3. The method of claim 1, wherein the cryptographic key, the cryptographic program and any cryptographic data are loaded into the secure memory after boot time and during the secure mode.

4. The method of claim 1, wherein the cryptographic program and the cryptographic key are loaded at different times during the secure mode.

5. The method of claim 1, further comprising verifying a user's personal identification number.

6. The method of claim 1 wherein the secure mode is a system management mode.

7. The method of claim 6, wherein prior to performing the security operation in the secure memory using the cryptographic program and cryptographic key, the method comprises suspending operation of an operating system.

8. The method of claim 1, wherein said cryptographic key, cryptographic program and any cryptographic data are obtained from a source that is available during a power-on initialization, said source to be made unavailable upon initialization of an operating system.

* * * * *